United States Patent
Kuppusamy et al.

(10) Patent No.: US 7,610,273 B2
(45) Date of Patent: Oct. 27, 2009

(54) APPLICATION IDENTITY AND RATING SERVICE

(75) Inventors: Ashok Kuppusamy, Seattle, WA (US); Alexander G. Gounares, Kirkland, WA (US); Elissa E. S. Murphy, Seattle, WA (US); Raymond E. Endres, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/085,614

(22) Filed: Mar. 22, 2005

(65) Prior Publication Data

US 2006/0218642 A1 Sep. 28, 2006

(51) Int. Cl.
*G06F 17/30* (2006.01)

(52) U.S. Cl. .................. 707/3; 707/9; 707/10; 707/100; 713/176; 713/182; 713/189

(58) Field of Classification Search ...................... 707/2, 707/3, 9, 10, 100; 713/176, 182, 189
See application file for complete search history.

(56) References Cited

U.S. PATENT DOCUMENTS

| | | | | |
|---|---|---|---|---|
| 5,920,873 | A * | 7/1999 | Van Huben et al. ......... 707/202 |
| 6,233,618 | B1 * | 5/2001 | Shannon ..................... 709/229 |
| 2002/0138471 | A1 * | 9/2002 | Dutta et al. ..................... 707/3 |
| 2002/0143692 | A1 * | 10/2002 | Heimermann et al. ......... 705/37 |
| 2002/0147706 | A1 * | 10/2002 | Burnett ......................... 707/3 |
| 2002/0169971 | A1 * | 11/2002 | Asano et al. ................ 713/193 |
| 2003/0066884 | A1 * | 4/2003 | Reddy et al. ............. 235/382.5 |
| 2003/0196110 | A1 * | 10/2003 | Lampson et al. ............ 713/200 |
| 2004/0054928 | A1 * | 3/2004 | Hall ............................. 713/201 |
| 2005/0060283 | A1 * | 3/2005 | Petras et al. ..................... 707/1 |
| 2006/0184559 | A1 * | 8/2006 | Arrouye et al. ............. 707/101 |
| 2006/0195480 | A1 * | 8/2006 | Spiegelman et al. ...... 707/104.1 |

\* cited by examiner

*Primary Examiner*—Hosain T Alam
*Assistant Examiner*—Syling Yen

(57) ABSTRACT

Authorization of a file on a computer is provided for using a cryptographic hash of the file or other identifier to find one or more content ratings. Content ratings, coupled with source and publisher ratings, are used to evaluate the file against an authorization policy set up by a user, manufacturer, or corporate IT department. Files which are suspect due to low ratings are not authorized to run on the computer. Files for which little information can be found are left to the user to decide whether to authorize. Rating services provide aggregated content ratings based on editorial or user reviews, and index their searchable ratings based on cryptographic hashes of the files being evaluated. Rating services provide allow lists and exclude lists or may provide individual responses to queries containing cryptographic hashes of files.

14 Claims, 9 Drawing Sheets

APPLICATION IDENTITY AND RATING SERVICE

FIELD OF THE INVENTION

Aspects of this invention relate to building trust in software code before installing or executing it.

BACKGROUND OF THE INVENTION

Although users and operating systems may work hard to prevent it, personal computers can become hotbeds of malicious software. So-called malware (e.g., worms, trojans, downloads, etc.) can attack a computer, delete files, steal personal information, propagate itself to a user's contacts, and generally make life difficult for the unsuspecting user. When a computer becomes infected with malware, user productivity decreases due to the loss of work product, the loss of computer performance, and the time spent trying to clean up the mess. Such productivity losses cost individuals and businesses great deals of time and money every year.

FIG. 2 depicts a variety of software entry points for a computer 209. Each entry point presents a possible channel for malware and other undesirable software to be copied or installed onto computer 209. The term malware is used to mean intentionally malicious software, and can include computer viruses (e.g., worms, Trojan horses), keystroke loggers, adware, spyware, and other programs that may have nefarious purposes running counter to the interests of the user or corporation to whom computer 209 belongs.

Not all undesirable software is necessarily malware. Such software may have no nefarious purpose, but may have side effects which are undesirable. For example, some corporations do not allow their employees to use instant messaging software, due to the distraction that such programs can create. Parents and other organizations may find that peer-to-peer file swapping networks are inappropriate on their computer, perhaps due to the likelihood of catching a computer virus from a download. Other reasons why otherwise benevolent software may be considered undesirable include excessive file size, excessive network traffic, system incompatibility, age-inappropriate material, or the program may just be plain annoying.

Returning to FIG. 2, there are many entry points through which executable code can be downloaded, copied, or otherwise installed onto computer 209. Returning to FIG. 2, there are many entry points through which executable code can be downloaded, copied, or otherwise installed onto computer 209. Perhaps the most prevalent source of malware and other undesirable software is the Internet 201, whether unfiltered, or partially filtered by a firewall 202. Executable code can be downloaded intentionally or unintentionally via web browsers, email programs, file swapping networks, instant message programs, Internet Relay Chat (IRC), and other programs which connect to the Internet. Usually, users initiate the download of malware from the Internet unintentionally (other undesirable software may be intentionally downloaded), although some malware can be injected onto computer 209 by a hacker or by another computer via existing software vulnerabilities on computer 209.

Another software entry point for computer 209 sitting on a network is second computer 203, which may be connected directly or indirectly via a LAN connection. A user may initiate a file copy from a second computer 203, or second computer 203 may automatically copy a file over to computer 209. Second computer 203 may be a server or any other compromised computing device connected by a network. Users are more likely to trust executable code which comes from within their own network, a potential vulnerability which has been exploited by some malware.

Additional sources of malware and other undesirable software may include personal digital assistant 204 or other synching devices, such as music players or cellular phones (not shown). Also, portable memory devices such as USB drive 205, or an external hard drive (not shown), may be a source of software. Conventional sources of software, such as a DVD ROM 206, CD ROMs, floppy diskettes, and so forth may also contain undesirable code. Ultimately, even a user 210 with enough experience could enter malicious or undesirable code directly into computer 210, without ever copying a single file. Such a user 210 could type in a script, for example, and execute it to track all keystrokes or credit card numbers used on computer 209.

The spectrum of personal computers users can be divided into three categories, based on the attention each pays to computer security. At one end are the extremely diligent users. These are the users who run firewalls and anti-virus programs, apply patches promptly, check the digital certificates of downloads, and research all software before installing it. At the other end are the carefree users. These are the users who install anything and everything, swap files on untrusted networks, ignore security messages, and whose machines are a veritable menagerie of software, both beneficial and malicious.

In between these extremes, there is the largest group of users overall. These conscientious users would like to keep their computers secure, but either don't have the time to commit to researching new software or malware, or don't understand enough about the implications of each installation decision. Despite these users' good intentions, they can easily be tricked into installing malware, sometimes without their knowledge. Even users who avoid the known malware tricks can't avoid some software due to the rapid evolution of malware. Once infected, these users have a difficult time finding and removing all vestiges of malicious software.

Ultimately, conscientious users of personal computers need new methods and systems for defending their computers against malware. They need to be able to make reliable decisions about installing new programs without having to waste a lot of time researching each publisher and application. They need a way to reliably keep their computers in the known good state the machine was probably in when it left the computer factory. They need to be able to avoid the trickery employed by makers of malware, and/or other problems with software, without having to become software experts. For a solution to the problem of malware and other undesirable software to be effective, it must be able to protect computer 110 from software arriving through most if not all of the entry points described above.

SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

A first aspect of the invention provides for authorization of a file containing computer-executable code. An authorization policy may be established, which may include an evaluation of one or more content ratings of the file, source and publisher information for the file, and/or other pieces of evidence. Content ratings may be sought by, for example, creating a cryptographic hash of the file and querying ratings services based on the hash. In addition to hashes of the file, one or a combination of identifiers may be used for an file (e.g. public key, application name, etc.).

A second aspect of the invention allows for providing a rating of a file. A rating request is received which may include a cryptographic hash of the file, other identifier, or a combination of identifiers. The hash may be used as a search key for a content rating search. A reply may be generated based on any found content ratings. The reply may also include source and/or publisher ratings as well.

These and other aspects of the present invention will be discussed below in Detailed Description of Illustrative Embodiments in connection with the figures.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF ILLUSTRATIVE EMBODIMENTS

In the following description of various illustrative embodiments, reference is made to the accompanying drawings, which form a part hereof, and in which are shown by way of illustration various embodiments in which the invention may be practiced. It is to be understood that other embodiments may be utilized, and structural and functional modifications may be made, without departing from the scope and spirit of the present invention. Although certain items in the following description are said to connect or be connected to each other, it should be understood that these items may be either directly or indirectly connected.

Illustrative Operating Environment

Figure 1:
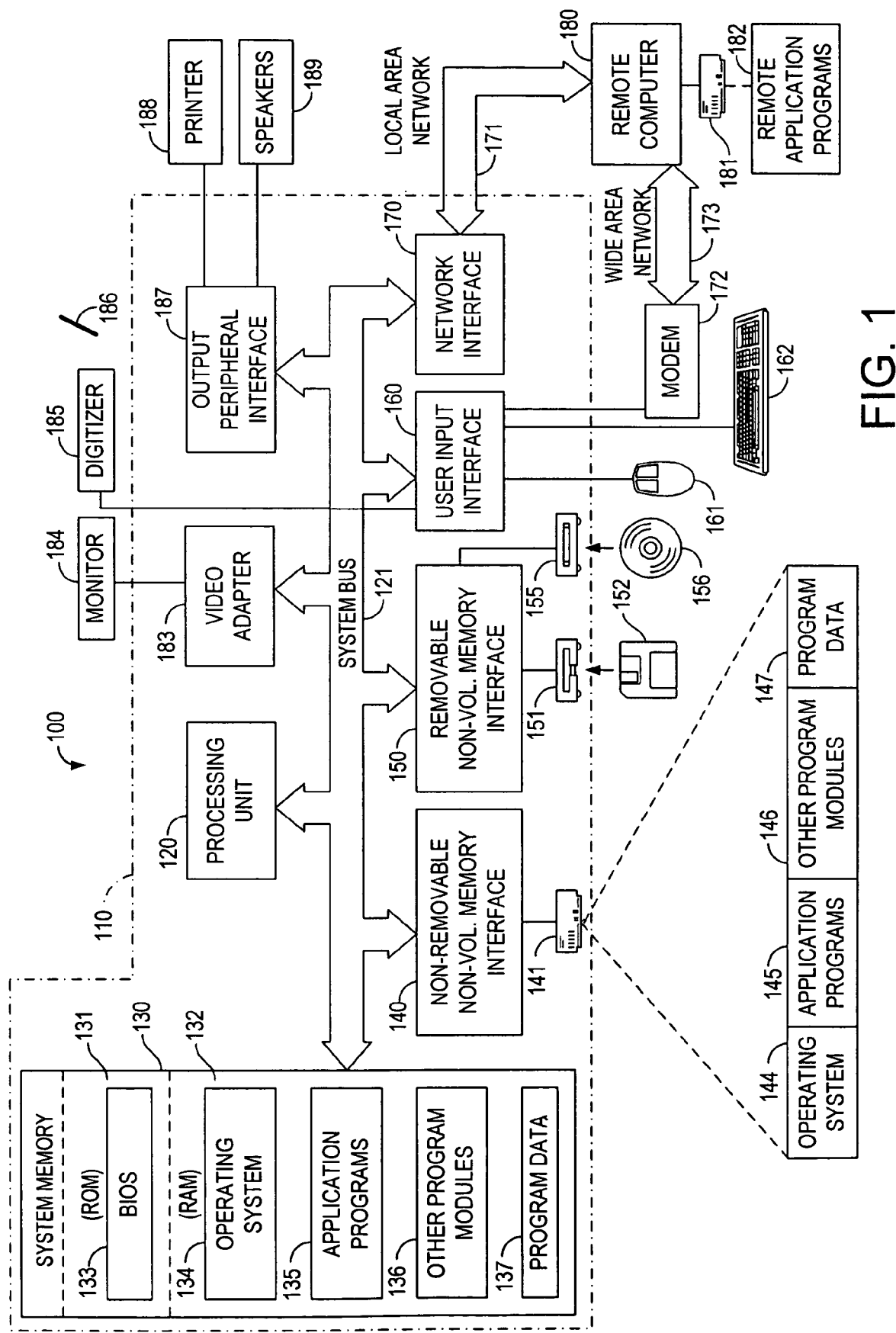
FIG. 1 is a functional block diagram of an operating environment that may be used for one or more aspects of an illustrative embodiment of the invention.
Figure 2:
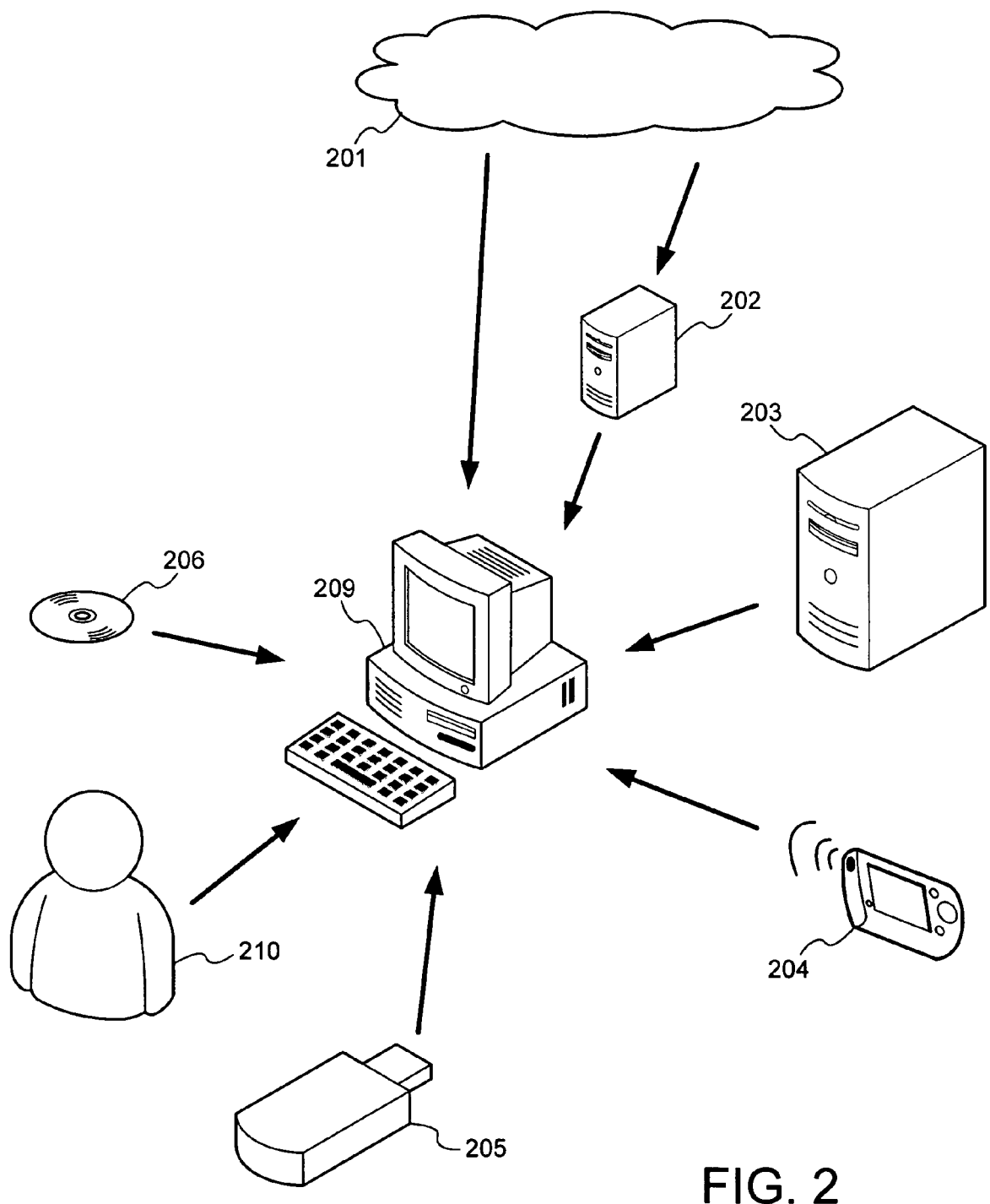
FIG. 2 depicts a variety of software entry points provided by an illustrative embodiment of the invention.

FIG. 1 illustrates an example of a suitable computing system environment 100 in which aspects of the invention may be implemented. Computing system environment 100 is only one example of a suitable computing environment and is not intended to suggest any limitation as to the scope of use or functionality of the invention. Neither should computing system environment 100 be interpreted as having any dependency or requirement relating to any one or combination of components illustrated in illustrative computing system environment 100.

The invention is operational with numerous other general purpose or special purpose computing system environments or configurations. Examples of well known computing systems, environments, and/or configurations that may be suitable for use with the invention include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. The invention may also be operational with distributed computing environments where tasks are performed by remote processing devices that are linked through a communications network. In a distributed computing environment, program modules may be located in both local and remote computer storage media including memory storage devices.

With reference to FIG. 1, illustrative computing system environment 100 includes a general purpose computing device in the form of a computer 110. Components of computer 110 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 110 typically includes a variety of computer-readable media. Computer readable media can be any available media that can be accessed by computer 110 such as volatile, nonvolatile, removable, and non-removable media. By way of example, and not limitation, computer-readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combinations of multiple computer-readable media are intended to be included within the scope of the term computer-readable medium.

System memory 130 includes computer storage media in the form of volatile and/or nonvolatile memory such as ROM 131 and RAM 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions including operating system 134, application programs 135, other program modules 136, and program data 137.

Computer 110 may also include other computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 110. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 110 through input devices such as a keyboard 162 and pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like.

These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 184 or other type of display device is also coupled to the system bus 121 via an interface, such as a video adapter 183. Video adapter 183 may have advanced 2D or 3D graphics capabilities, in addition to its own specialized processor and memory.

Computer 110 may also include a digitizer 185 to allow a user to provide input using a stylus 186. Digitizer 185 may either be integrated into monitor 184 or another display device, or be part of a separate device, such as a digitizer pad. Computer 110 may also include other peripheral output devices such as speakers 189 and a printer 188, which may be connected through an output peripheral interface 187.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 110 is coupled to the LAN 171 through a network interface or adapter 170. When used in a WAN networking environment, computer 110 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 110, or portions thereof, may be stored remotely such as in remote storage device 181. By way of example, and not limitation, FIG. 1 illustrates remote application programs 182 as residing on memory device 181. It will be appreciated that the network connections shown are illustrative and other means of establishing a communications link between the computers may be used.

Application Identity

Accurate recognition of computer-executable code allows software to be properly identified, independent of filename. Computer-executable code on computer 110 is virtually always stored in conventional computer files, whether stored on hard disk-drive 141 or in another form of memory. Each file may be provided a filename, one which is typically readable and provides some guidance as to the contents of the file. However, filenames can be easily changed and are not a reliable way of identifying the executable code stored within the file. Even the same file having the same filename can have updates and revisions, such that the content of the same-named file (e.g., winword.exe) may contain entirely different pieces of executable code. Moreover, the code within familiar applications can be digitally modified and compromised, injecting malicious code directly into the underlying program.

Using a hash of the contents of a file offers a more reliable, content-specific way of identifying a file. Other ways of more reliably identifying a file may include using a filename, a file size, an associated public key, or some combination thereof. Cryptographic hashes are one content-specific tool well known among computer security professionals. They are frequently used to create digital signatures, used in assuring that messages and files are truly coming from their purported source. Cryptographic hashes essentially are digital fingerprints and may be based on the contents of a file. The filename may be ignored. Although a hacker can easily mimic a filename, it is effectively impossible to mimic the content of the file with a modified version and be able to maintain the same cryptographic hash.

Figure 3:
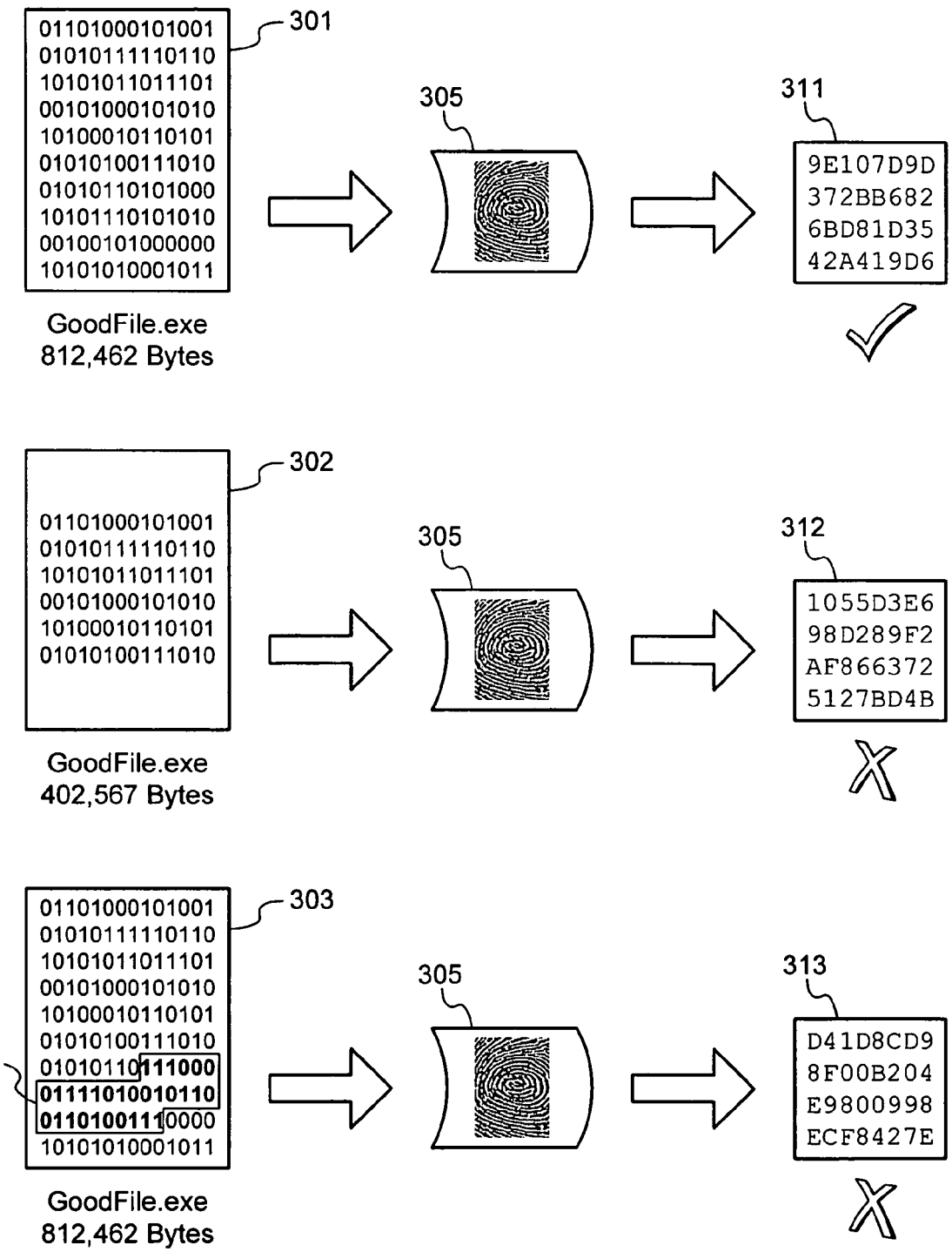
FIG. 3 depicts the use of a cryptographic hash to create content-specific identifiers provided by an illustrative embodiment of the invention.

FIG. 3 depicts the use of a cryptographic hash to create content-specific identifiers provided by an illustrative embodiment of the invention. The hash utilized may be the product of any well-known hash function, such as SHA-1 or MD-5, or may be the product of any effectively unique content-specific hash function. These hash functions take a message, the digital content of a file, and run it through a standardized mathematical function to create a digest, or digital fingerprint, which may be a 128-bit, 160-bit, or any other sized chunk of data. Small changes in the message create radically different digests, and the digest provides no useful information about the content of the file, other than its identity. Two files having exactly the same content (having no other data appended) will produce exactly the same digest. The likelihood of two different files having exactly the same digest is infinitesimally small, so as to create an effectively unique content-dependent identifier. The process and product of creating unique digests for files containing executable code may be referred to herein as application identity.

In the illustrative embodiment shown in FIG. 3, message 301 is the file, "GoodFile.exe," having a certain size and content. The digital content of the file includes executable code, code which is believed to be benevolent. Running the content of the file through hash function 305 produces digest 311 having 128 bits. Counterfeit message 302 is a file called, "GoodFile.exe," but we are not certain that it is the same file. First of all, counterfeit message 302 has a different size, which is an easy indication that its contents are not the same as message 301. When the contents of counterfeit message 302 are run through the same hash function 305, it produces a completely different digest 302. Because of this difference in digests, we can now be assured that counterfeit message 302 does not contain the same content as message 301. Counterfeit message 303 presents a bigger challenge. This file has the same filename, and exactly the same size in bytes. It even looks very much like the same code as inside message 301. However, malicious code segment 320 has been injected into the file, replacing some code so that the file size is the same. Running the file through the same hash function 305, however, produces a different digest 313. Again, because of this difference in the digests, we are assured that counterfeit message 303 is not the same "GoodFile.exe" as message 301.

Such hash functions may be computed for all computer files known to contain benevolent executable code. This list of digests is referred to herein as an allow list. Likewise, hash functions may be computed for all files known to contain malicious executable code, referred to herein as an exclude list. These lists may not just include known applications, but may also include files containing dynamically linked code, documents containing scripts, and any other file containing potentially undesirable instructions for a computer. Having an allow list and an exclude list of digests of known executable code enables a computer to generate a digest for a file recently downloaded or copied, and compare it to the catalog of known digests. In this way, counterfeit applications and known bad code can be excluded from execution without having to analyze the instructions contained within the file line by line, or relying on other evidence.

Just having a list of known digests may not be enough to exclude all bad code from being installed or executed on a computer. There are literally millions of files containing executable code residing on Internet servers and CD ROMs around the world. New executable code, both good and bad, is being written every day. Maintaining a list of known digests is a starting point, but additional evidence may be needed to judge whether executable code downloaded or otherwise installed on a computer is undesirable.

Such additional evidence may include the location from which the software was downloaded, such as a network address or portion thereof (e.g. internet protocol (IP) address or portion of an IP address) and/or a domain or portion of a domain (e.g., malware.com). Evidence may also include the public key for any digitally signed code, either downloaded or copied. Each piece of evidence about the source of the code may also be compared against various allow lists and/or exclude lists, for IP addresses (or portions of IP addresses) known to be good or bad, domains (or portions of domains) known to be good or bad, and/or certificate signers known to be good or bad. Although not as reliable as evaluating the file itself, examining the source and signature of executable code may provide further evidence as to whether or not the code should be run, downloaded, or copied. Additionally, combinations of evidence respective to a file identifier (or identifiers) can serve to provide a stronger form of evidence.

Ultimately, individual computer users may develop policies for themselves based on application identity, source, and signature, as well as other evidence. They may configure their computers to automatically exclude some files and automatically install other files. Those files which miss certain thresholds may require a dialog be shown to the user asking him or her to decide whether they trust the installation. Hopefully, however, such dialogs will be minimal, so as to not annoy the user and lose all effectiveness. More on such trust policies is set forth below.

Figure 4:
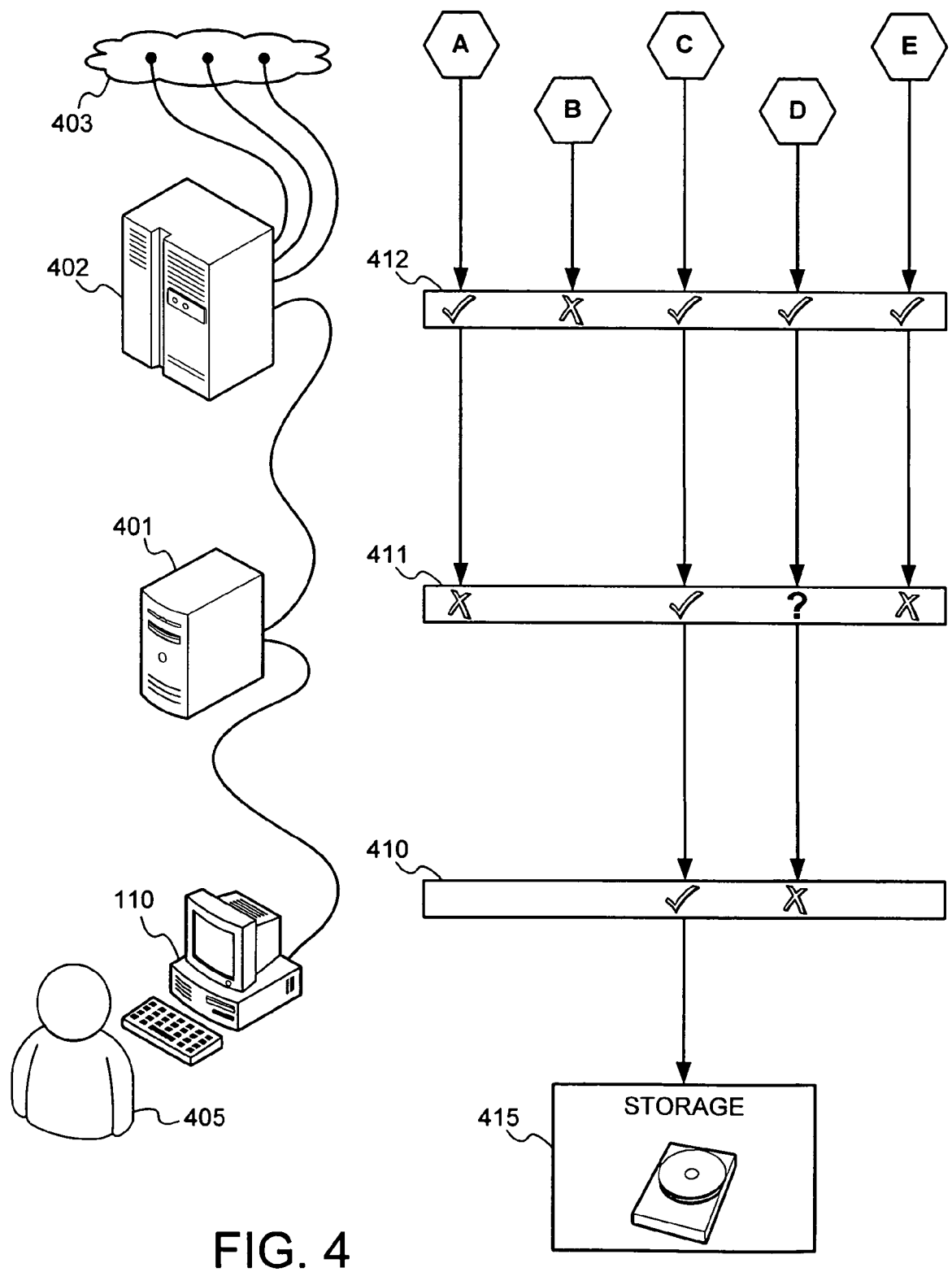
FIG. 4 depicts a tiered approach to excluding undesirable software provided by an illustrative embodiment of the invention.

FIG. 4 depicts an example of a tiered approach to excluding undesirable software from computer 110 provided by an illustrative embodiment of the invention. Corporate computer user 405 is using computer 10, which is connected to the Internet 403, via a corporate server 401 and via an Internet Service Provider (ISP) 402. The connections shown are merely representative, as other computers, routers, network appliances, modems, etc., may be connected in between the devices shown. Each device 402, 401, 110 has software 412, 411, 410 with exclusion policies implemented, each using evidence about software entering from the Internet 403. Each may use application identity, as described above, to create digests which are then compared to various allow lists and exclude lists. Software 412, 411, 410 on each device may also use evidence about the source and public key of each piece of incoming software, again using allow lists and exclude lists that may include associated evidence to selectively allow or exclude files. Different policies may be enacted at different levels in order to allow for various considerations, such as frequency of updates, processing power, and so forth.

Files A-E have each either been requested by or sent to computer 110, either as attachments to email, or as Internet downloads of one sort or another. At the ISP 402, software installed on one or more servers may be checking for particular files among all the Internet traffic that is delivered to their customers. This software may perform hashes on all files, and evaluate source IP addresses or portion of IP address, public key, and domains. Given the volume of traffic handled by ISP 402, however, it may only evaluate IP addresses and domains.

The computational requirements for building digests for every incoming file may be too great for ISP 402 to handle, so other forms of evidence may be utilized in combination with other file identifiers. In addition, the delay caused by such computations may be undesirable for end user 405, especially for downloads specifically requested by the user. Even with a cursory search, ISP 402 may be able to exclude file B, knowing that everything that comes from a particular IP address is always malicious. Any file filtering that takes place at the ISP level is likely only the most optimistic, allowing most files, excluding only those files for which the evidence is overwhelming against allowing them. This may include, for example, email worms and Trojan horses.

Once files A and C-E are received by corporate server 401, they may again be evaluated based on digest, source, and/or public key. At this level, the computational requirements may allow for hash calculations, and the files may be compared against various allow lists and/or exclude lists that may include additional forms of evidence. Corporate server 401 may exclude not only known bad files, but may also exclude certain files for corporate policy reasons. For example, using application identity, corporate server 401 may, as a rule, exclude Internet chat programs or instant message programs. In this manner, corporate server 401 prevents user 405 from downloading a banned file in the first place, let alone installing it. In addition, at the corporate level, applications which do not appear on either an allow list or an exclude list may be passed on to the user. Here, file A may be excluded for policy reasons, perhaps because it is a game. And file D is not recognized on any of the lists, and so is allowed to go through.

Finally, by the time files C and D get to computer 110, they have already been evaluated, if only on a cursory level, by two other layers of protection. Software 410 operating on computer 110 is able to evaluate further evidence about files C and D. Application C is allowed to be installed on storage 415 of computer 110, because its digest appears on an allow list of installable applications. File D, unrecognized by corporate server 401, may not appear on any known lists on computer 110. However, because the source domain of the address is known to be suspicious, the policy set up on computer 110 excludes file D.

Rating Services

While the setup provided in FIG. 4 may be preferred for its multiple levels of protection, computers which reside in small business, in homes, and in unenlightened corporations may not be afforded additional layers of protection. Software on these machines may have to do all the work associated with allowing and excluding files. As such, these computers need sources of information about files, IP addresses (or portions of IP addresses), public keys, and domains (or portions of domains) that they can trust.

Figure 5:
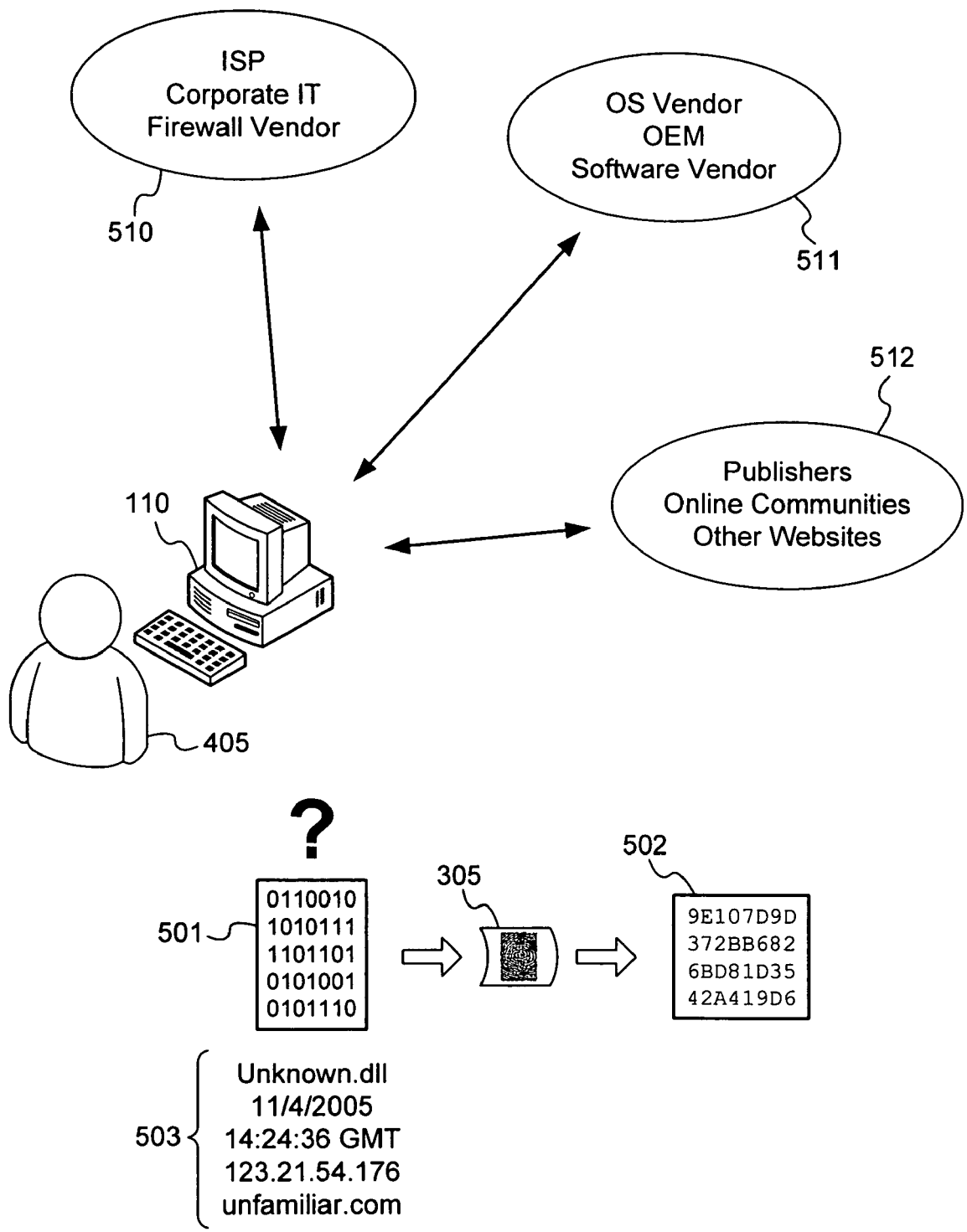
FIG. 5 depicts the use of software rating services provided by an illustrative embodiment of the invention.

FIG. 5 depicts the use of software rating services by computer 110 provided by an illustrative embodiment of the invention. Computer user 405 would like to enable software on computer 110 to use allow lists and exclude lists in order to selectively exclude or allow software to be installed or copied onto computer 110. Computer user 405 has just downloaded suspect file 501 "Unknown.dll" containing executable code. Computer 110 generates digital fingerprint 502 using hash function 305. In addition, computer 110 collects one or more pieces of evidence about suspect file 501 in the form of time and date of download, source IP address (or portion of IP address) and source domain name (or portion of domain). Such additional evidence may include information about a public key for suspect file 501. In the case of files copied to computer 110 from another device not on the Internet, less information about the source may be available.

Computer user 405, when installing software to filter executable code, may have selected a rating service from among the universe of ratings services 510, 511, 512 available via a network such as an intranet or the Internet. Alternatively, the software may have been installed by the original equipment manufacturer (OEM) before computer 110 was shipped from the factory. In either case, a rating service may have been pre-selected for or by the user.

A rating service is a provider of trust recommendations for individual software files and/or software sources. A rating service may provide complete allow lists and/or exclude lists to computer 110. Alternatively, computer 110 may query a rating service, providing identifiers and a body of evidence about a file, and getting a reply from the rating service with a recommendation. In either case, the user, the OEM, or a corporate IT department has chosen a rating service because they trust that the owner of the rating service will make accurate and trustworthy selections.

Rating services may be created and maintained by connectivity providers 510, software or hardware vendors 511, or third party providers 512 (to which computer 110 has no relationship). Connectivity providers 510 of rating services may include the corporate IT department for the corporation to which computer 110 belongs, an Internet Service Provider who provides Internet connectivity, or a vendor of network software such as a firewall vendor. Software or hardware vendors 511 may be providers of rating services based on their existing relationship to computer 110. An operating system (OS) vendor may provide software to filter files with the operating system, and may pre-populate computer 110 with allow lists and/or exclude lists. In addition, the OS vendor (e.g., Microsoft, Red Hat, Apple) may provide updates to the lists, as well as handle rating service queries. Likewise, an OEM vendor (e.g., Dell, Toshiba) may provide such software and also provide the rating service. Finally, the software to filter files may be packaged separately, and the vendor selling it may provide a rating service. In each case, an organization with which computer 110 should have a prior trust relationship may take on the duty of providing updated rating services to computer 110.

Third party providers 512 of rating services may include online communities and publishers whom user 405 trusts. This may include publishers who already rate software and products (e.g., CNET, PC Magazine, Consumer Reports, Jack & Jill Magazine), online communities of interest (e.g., MSDN, Slashdot, churches, professional societies, etc.), or other trusted information providers (e.g., Symantec, McAfee). In addition, groups of users may band together and form their own rating service, with white and exclude lists.

Rating services 510, 511, 512 provide computer 10 with information about individual files containing executable code and sources of files. This information may be stored in a database, in a flat file, in a web page, or other structured storage medium. Files may be indexed based on a computed hash digest or other identifiers. When computer 110 queries a rating service, the query includes a digest of the suspect file (which may be computed by computer 110) or other identifier, possibly accompanied by source and public key information. In response to the query, the rating service may perform a search for a recommendation of the file using the digest received from computer 110 as a search key. Based on its own information sources (e.g., the feedback or experience of other users, editorial and/or technical evaluations, etc.), the rating service may provide a recommendation in the form of a content rating in response.

A rating service may also search a database (or other structured storage) for the source IP address or a portion thereof, the domain, or the publisher (from the certificate), or public key. Based on its own information sources (e.g., experience with other files from that source, country of origin, privacy policy, etc.), the rating service may provide a source rating as an alternative to (or in addition to) the content rating. It can be expected that a solid content rating for or against a particular file will be stronger than a source recommendation, but a source rating may provide enough information for computer 10 and/or user 405 to decide whether or not to install or run the file.

A rating service may be able to provide additional information about a file that can be used by an authorization policy in determining whether to install or run. This may include the following: Is the file recommended? Is the file virus free? Does the file provide a standardized add/remove option? Does the file overwrite system settings like firewall ports or file associations? Does the file auto-update by default? Does the file use a privacy guarantee? Is the publisher recommended? How much risk is associated with the file? Does the file listen on ports for incoming connections? Will the file change firewall settings automatically to listen on ports? Is there an editorial review of the application? Is there more information on the publisher's privacy practices?

One difficulty confronted by rating services is the constant updating and patching of software which occurs after a user has installed an application. For example, an operating system such as Windows XP™ may require regular updates and patches to provide new functionality or patch bugs and security holes. Each new patch would have a new content-dependent identifier, greatly expanding the size of a database of tracked software, perhaps unnecessarily. Rating services may track a family of related software without tracking individual updates or patches. For example, a received query may include not only the identifier of the update, but also the identifier of the software being updated. In addition, the received query may include the signed publisher of both the update or patch, and the underlying software. If both pieces of software are signed by the same publisher, and the publisher is trusted, then the update may be provided a positive rating without actually evaluating it. This may save a rating service from needing to evaluate every patch or update.

Figure 6:
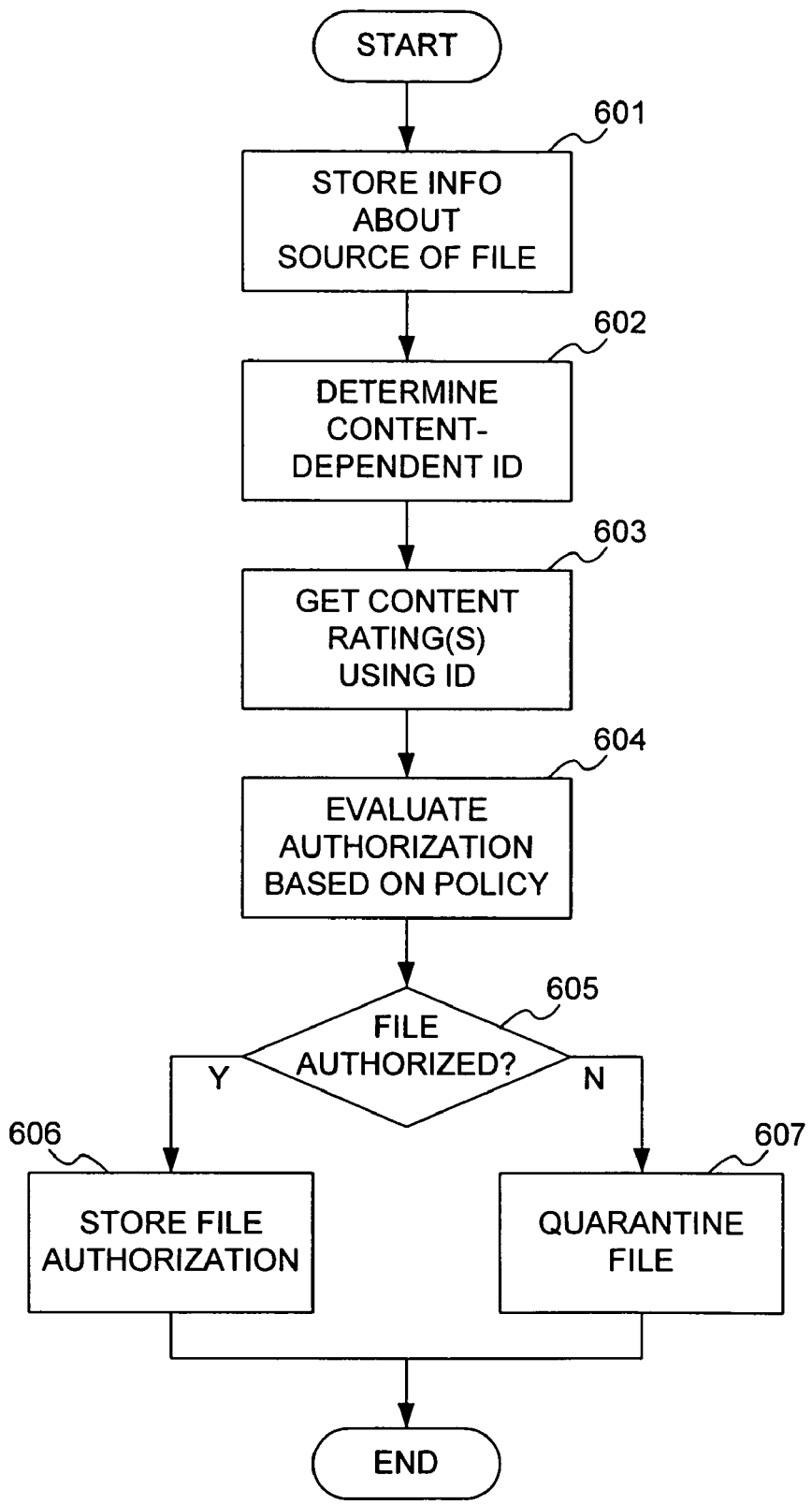
FIG. 6 is a flowchart showing a method for authorizing a file provided by an illustrative embodiment of the invention.

FIG. 6 illustrates a method for authorizing a file using a rating service provided by an illustrative embodiment of the invention. When a new file containing executable code is detected within computer 110, information about the file is stored at step 601, which may include information about a publisher, a source, a time of download, a file size, and other evidence which may assist in an installation or application execution decision. At step 602, a computer 110 determines a content-dependent identifier or identifiers for the file, perhaps using a SHA-1, MD-5, or similar hash function to produce an effectively unique content-dependent identifier. At step 603, a query is assembled to be sent to one or more rating services in order to get a content rating. The query may include an XML or HTML segment, including the content-dependent identifier, source and public key information, download time, and so forth. The information provided in the query may be meant primarily to confirm the identity of the suspect file, and hopefully procure the most accurate rating from the one or more rating services. The query may alternatively take one of many other forms, including a pre-determined text or binary query. The rating service or services may provide evidence about the file in the form of responses.

At step 604, computer 110 evaluates the file against an installation or execution policy. The policy may have been configured by either the user, the corporate owner, the hardware vendor, the operating system vendor, or some other related party. The policy may include a user query in certain instances. If the file is authorized using the policy, at decision 605, then the fact of authorization will be stored. Storing this authorization may be important, as executable code may be rechecked to see if it's authorized when it is actually being fetched to run or being processed. Because not every piece of executable code entering computer 110 will necessarily be caught (e.g., where it was entered by a user via the keyboard), code may need to be checked for authorization each time it runs. Such a check may be installed at a low level within the computer, such as in the operating system. Having such a step would ensure that only pre-authorized code will run. If the authorization policy did not authorize the file, then at step 607, the file will be quarantined. This may mean that it will be deleted or further inspected for malicious code. Regardless, the file will not be able to run without more investigation or may only be able to run in a limited mode without additional forms of evidence.

Figure 7:
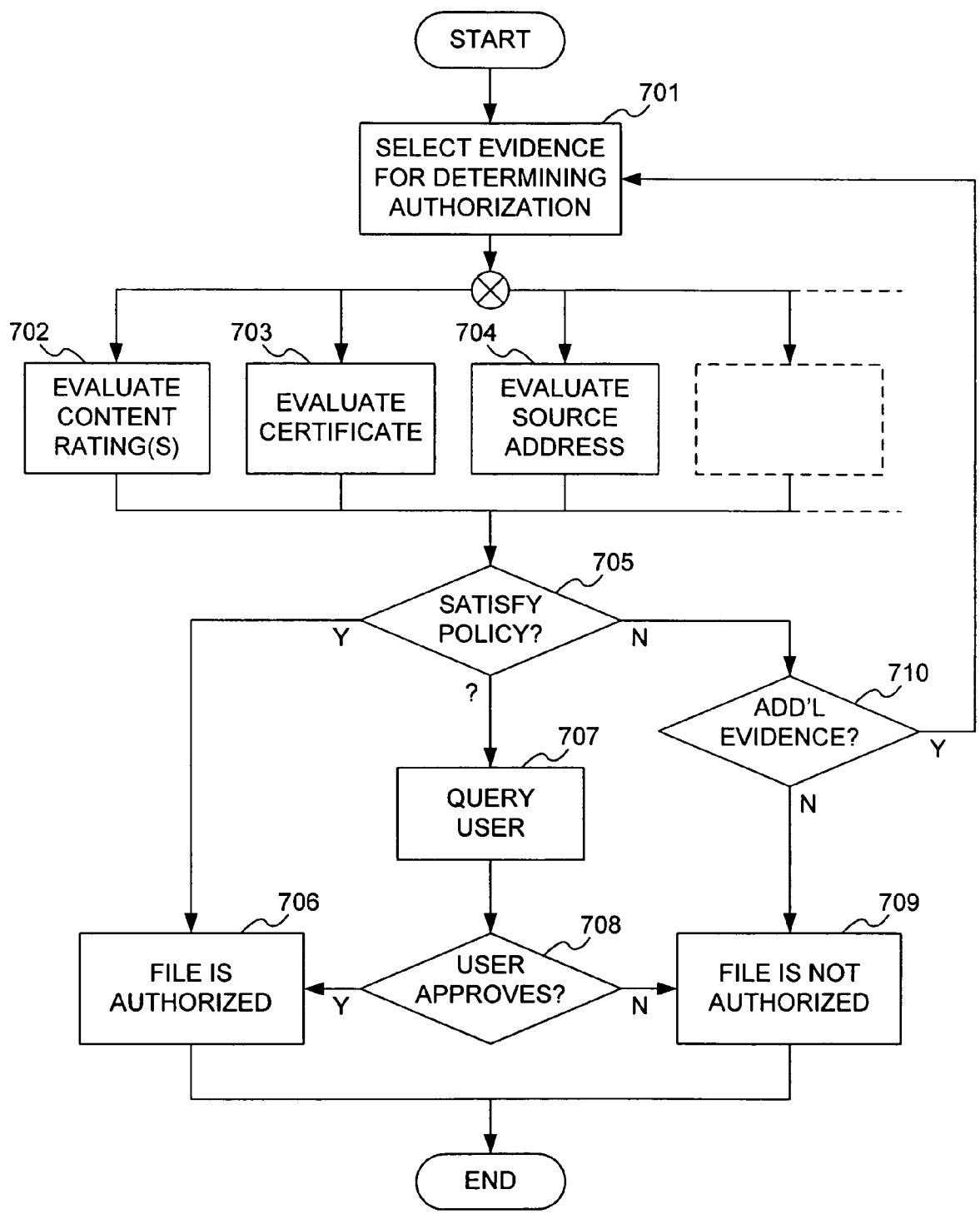
FIG. 7 is a flowchart showing a method for evaluating file authorization using a policy provided by an illustrative embodiment of the invention.

FIG. 7 illustrates a method for evaluating file authorization using a policy provided by an illustrative embodiment of the invention. Here, computer 110 has gathered evidence about a file that has recently been added. At step 701, computer 110 inspects a first body of evidence to determine authorization. There may be a ranking to the evidence. For example, the content rating(s) at step 702 may first be examined, the publisher at step 703 may next be examined, and then the source address at step 704 may be examined. Additional evidence may be used, such as the additional information provided by the ratings services listed above. At decision 705, each individual piece of evidence or combination of evidence is evaluated against the policy put in place. If the first evidence examined is a content-based rating or multiple ratings, and none of the queried rating services provided any useful evidence, then additional evidence may be needed. At decision 710, if there is additional evidence available which may salvage the program, then computer 110 may reevaluate the policy. If no more evidence is available, then the file is not authorized at step 709. Back at decision 705, if the file is determined to be authorized based on the policy, then at step 706, the file is authorized. If the policy determines that it is not clear whether or not the file should be authorized, then at step 707, a dialog may be presented to the user providing information including content ratings for the file in question. The user then decides whether to authorize the file at decision 708.

Policies may be enacted by an individual user or may be enacted at the enterprise level to enforce corporate software policies. Policies may also be enacted by default by the manufacturer of the computer or the provider of the operating system or file filtering software. Moreover, users or enterprise managers may sign up for rating services by visiting multiple rating service websites, or a single website providing access to several different rating services. Configuring policies may require providing users a complex interface, one which is flexible enough to provide a hierarchy of complex rules. An example of a configured security policy may look like the following: (1) Trust all software signed by Microsoft, (2) Trust all software known and recommended by PC Magazine (no signature necessary), (3) Prompt user for other signed software, and (4) Reject all other unsigned software. Rating conflicts among multiple rating services (e.g., CNET says a piece of software is good, but Slashdot says it's bad) will certainly arise. Reconciling these conflicts may require configurable policies, such as the priority system described above. Alternative policies may include only allowing software which all subscribed rating services approve, weighting evaluations from particular rating services or of particular publishers, and so forth.

Figure 8:
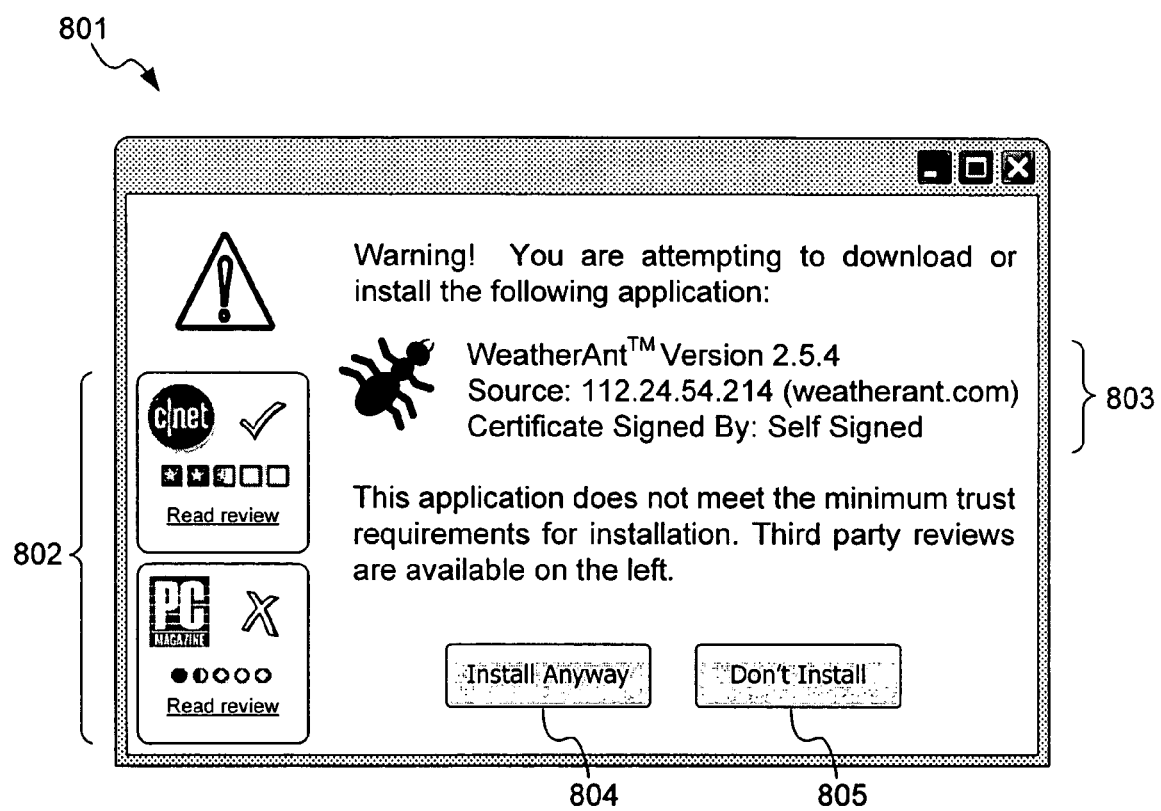
FIG. 8 depicts a sample authorization dialog including third party ratings provided by an illustrative embodiment of the invention.

FIG. 8 depicts a sample authorization dialog 801 including third party ratings provided by computer 110 according to an illustrative embodiment of the invention. When a user's authorization policy calls for it, dialog 801 will ask whether or not they would like a particular file 803 to be authorized. Hopefully, the use of such a dialog will be minimal, so as not to annoy the user. Dialog 801 includes information about file 803, rating service reviews 802 of the program, as well as buttons 804, 805 to authorize or decline the installation. Dialogs similar to dialog 801 may be used when previously unauthorized executable code is attempting to execute for the first time, is being installed on computer 110, or is being transferred to computer 110. In addition, such dialogs may be used when executable code attempts to access or modify a sensitive aspect of computer 110 for the first time, including but not limited to changing a browser start page, accessing a network, writing to a particular registry key, etc.

Figure 9:
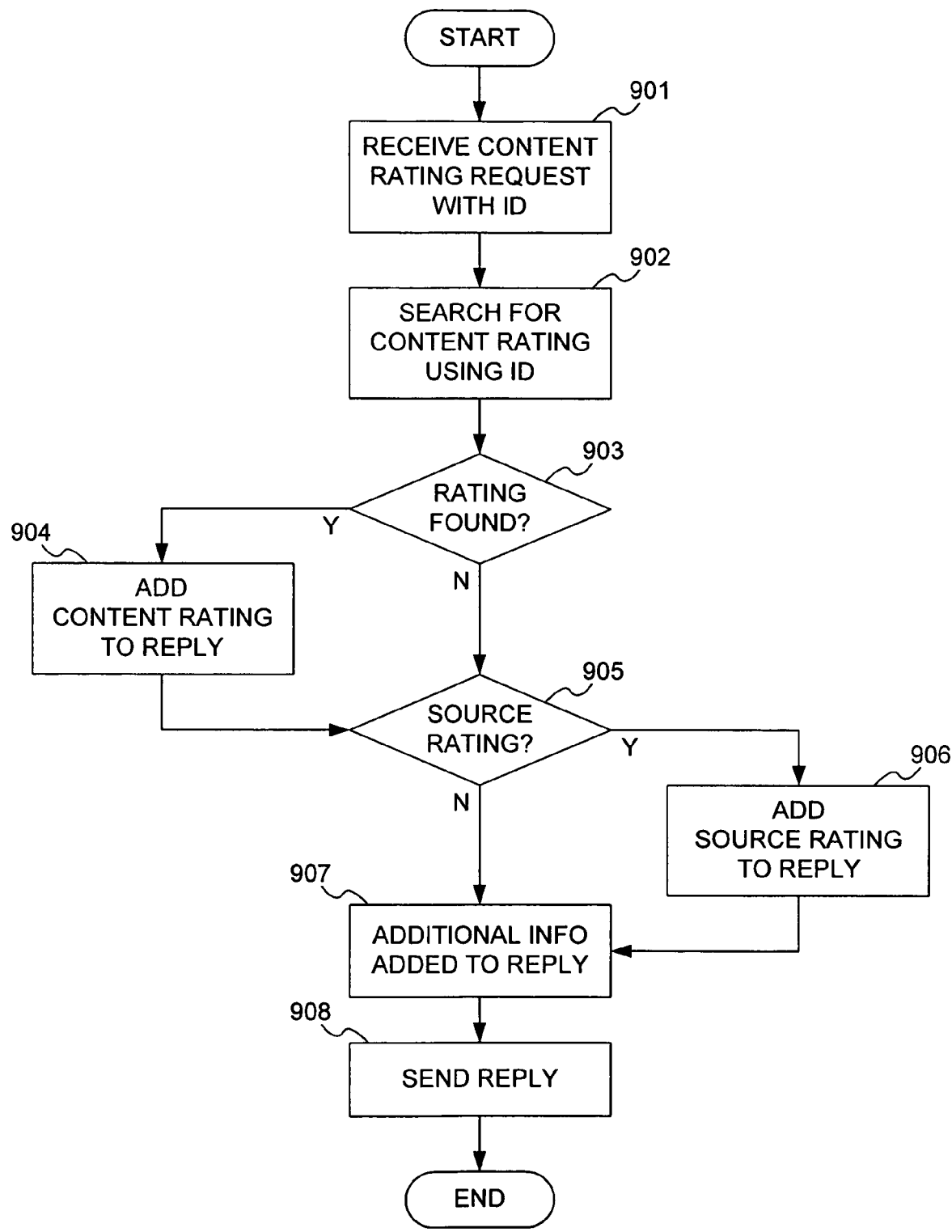
FIG. 9 is a flowchart showing a method for providing a rating for a file as provided by an illustrative embodiment of the invention.

FIG. 9 illustrates a method for providing a rating for a file as provided by an illustrative embodiment of the invention. Rating services may use a method similar to the one illustrated here to provide content and source ratings. As described above, the rating service will maintain a database of ratings. When a user wishes to install or run a file, computer 110 may issue a query to a rating service using a predetermined format (e.g., XML or HTML) which includes an effectively unique content-dependent identifier or identifiers. The query may also include file source information. At step 901, the rating service receives the query and at step 902, searches for a content rating using the content-dependent identifier or identifiers as a search key. If a rating is found at decision 903, then at step 904, the content rating information is added to the reply. If, at decision 905, information about the file source is available, then at step 906, the source information is added to the reply. At step 907, any additional information of the sort described above is added to the reply. And at step 908, the reply is sent back to computer 110.

While the invention has been described with respect to specific examples including presently preferred modes of carrying out the invention, those skilled in the art will appreciate that there are numerous variations and permutations of the above described devices and techniques that fall within the spirit and scope of the invention as set forth in the appended claims. A claim element should not be interpreted as being in means-plus-function format unless the phrase "means for", "step for", or "steps for" is included in that element. Also, numerically-labeled steps in method claims are for labeling purposes only and should not be interpreted as requiring a particular ordering of steps.

What is claimed is:

1. A computer-implemented method for authorizing a first file containing computer-executable code, the method comprising:
    establishing an authorization policy;
    determining a first content-dependent identifier for the first file, wherein the content of the first file includes executable code and the first file is an update or a patch for a second file;
    determining a second content-dependent identifier of the second file, the second content-dependent identifier being different from the first content-dependent identifier for the first file;
    determining first publisher information for the first file;
    determining second publisher information for the second file;
    searching for evidence about the first file, wherein when the first publisher information and the second publisher information indicate a same publisher published the first file and the second file, and when the same publisher is trusted, wherein searching comprises a search of one or more rating services based on the second content-dependent identifier;
    when the evidence satisfies a condition in accordance with the authorization policy, displaying at least a portion of the evidence, the portion including at least one or more ratings from the one or more rating services and requesting an input from the user;
    determining that the first file is unauthorized based on the evidence from the search using the authorization policy and based on the input from the user; and
    reducing ability of the unauthorized first file to execute.

2. The method of claim 1, wherein the authorization policy is a default authorization policy provided by a manufacturer or software provider.

3. The method of claim 1, wherein searching for evidence comprises searching an allow list and an exclude list.

4. The method of claim 1, wherein the search is based on information about a publisher of the second file.

5. The method of claim 1, wherein the search is based on a source address of the second file.

6. The method of claim 5, wherein the search is based on at least a portion of an IP address.

7. The method of claim 5, wherein the search is based on at least a portion of a domain name.

8. The method of claim 1, wherein the first content-dependent identifier comprises a cryptographic hash of the contents of the first file.

9. The method of claim 1, further comprising:
    responsive to determining that the first file is unauthorized, redetermining that the first file is unauthorized based on the authorization policy using additional evidence about the unauthorized first file.

10. A system for authorizing a first file containing computer-executable code, the system comprising:
    a storage element, configured to store the first file and information about the first file; and
    a processor coupled to the storage element and configured
        to determine a first content-dependent identifier for the first file, wherein the content of the first file includes executable code and the first file is an update or a patch for a second file,
        to determine a second content-dependent identifier of the second file, the second content-dependent identifier being different from the first content-dependent identifier for the first file,
        to determine first publisher information for the first file,
        to determine second publisher information for the second file,
        to search, when the first publisher information and the second publisher information indicate a same publisher published the first file and the second file, and when the same publisher is trusted, a collection of evidence for information about the first file using the second content-dependent identifier, the collection including data from one or more rating services,
        to, when the collection of evidence satisfies a condition in accordance with an authorization policy, display at least a portion of the collection of evidence, the portion including at least one or more ratings from the one or more rating services and request an input from the user, and to determine whether the first file is authorized based on search results and the authorization policy and the input from the user.

11. The system of claim 10, wherein the second content-dependent identifier is a cryptographic hash of the contents of the second file.

12. The system of claim 10, wherein the processor is further configured to store information about a publisher of the first file in the storage element, wherein the publisher is determined based on a public key associated with the first file.

13. The method of claim 1, wherein said determining that the first file is unauthorized further comprises querying a user as to whether the first file is unauthorized; and receiving a user input indicating that the first file is unauthorized.

14. The system of claim 10, wherein the processor is further configured to install, execute or store the first file if the first file is authorized, and to prevent installation, execution or storage of the first file if the first file is unauthorized.

* * * * *